United States Patent [19]

Spencer

[11] Patent Number: 5,194,885
[45] Date of Patent: Mar. 16, 1993

[54] METHODS OF, APPARATUS FOR, AND A CAMERA CAPABLE OF AUTOMATICALLY SELECTING AN OPTIMAL ANGLE FOR BOUNCE ILLUMINATION

[75] Inventor: John E. Spencer, Geneseo, N.Y.

[73] Assignee: Eastman Kodak Company, Rochester, N.Y.

[21] Appl. No.: 716,141

[22] Filed: Jun. 17, 1991

[51] Int. Cl.⁵ .............................................. G03B 15/03
[52] U.S. Cl. ................................. 354/132; 354/149.1
[58] Field of Search ...................... 354/413, 415, 145.1, 354/149.1, 132

[56] References Cited

U.S. PATENT DOCUMENTS

| | | | |
|---|---|---|---|
| 4,078,240 | 3/1978 | Kaneko et al. | 354/149.1 |
| 4,384,238 | 5/1983 | Greenwald et al. | 354/132 |
| 4,512,644 | 4/1985 | Yoshida | 354/149.1 |
| 4,657,367 | 4/1987 | Kataoka | 354/415 |
| 4,847,647 | 7/1989 | Ueda | 354/149.1 |
| 4,970,539 | 11/1990 | Sasagaki et al. | 354/149.1 |
| 5,040,007 | 8/1991 | Hagivda | 354/149.1 |
| 5,136,312 | 8/1992 | Weaver et al. | 354/149.1 |

*Primary Examiner*—Russell E. Adams
*Attorney, Agent, or Firm*—Millen, White, Zelano and Branigan

[57] ABSTRACT

The angle "$\alpha$" which an illumination axis of an illuminator, such as a flash illuminator, assumes with respect to the optical axis of a camera in a bounce flash mode is selected in accordance with the equation:

$$\alpha = \text{Tan}^{-1}(2H/D)$$

wherein;
H = the distance from the camera to the ceiling; and
D = the distance from the lens of the camera to the subject.

Preferably, values for H and D are determined by range finders on the camera and the equation is solved by a logic circuit. The output of the logic circuit causes a servo motor to angularly position the illuminator on the camera.

15 Claims, 3 Drawing Sheets

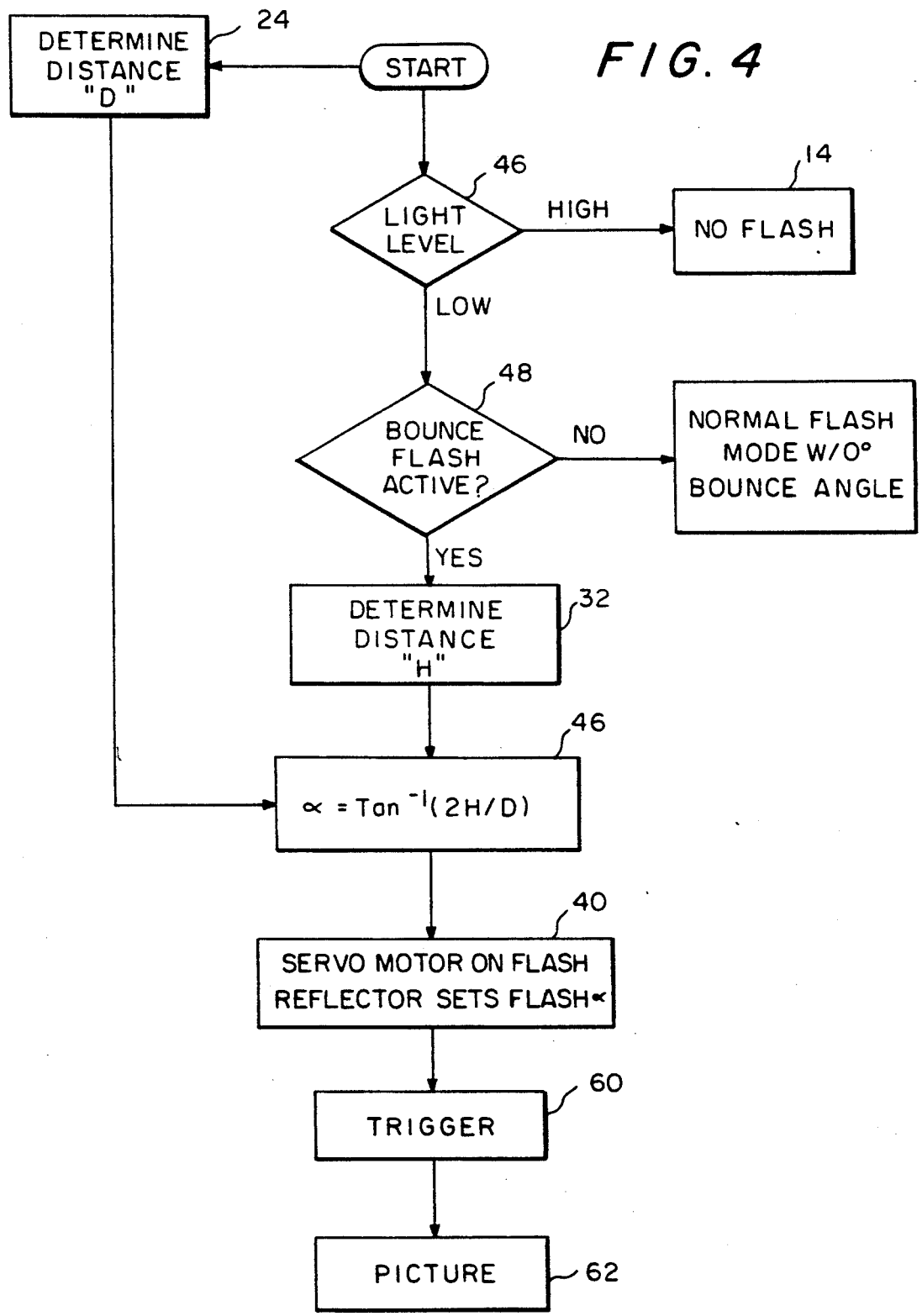

METHODS OF, APPARATUS FOR, AND A CAMERA CAPABLE OF AUTOMATICALLY SELECTING AN OPTIMAL ANGLE FOR BOUNCE ILLUMINATION

TECHNICAL FIELD

This invention relates to methods of, apparatus for, and a camera capable of automatically selecting an optimal angle for bounce illumination. More particularly, the invention relates to methods of, apparatus for, and a camera capable of selecting an optimal angle for bounce illumination wherein light from the illuminator of a camera is reflected from the ceiling of a room in which an image is being recorded.

BACKGROUND ART

Flash units for still cameras are usually mounted on the camera and are oriented so that flash illumination extends substantially parallel to the axis of the optical path of the camera lens. This results in substantially direct, sometimes intense, illumination of the subject or scene being photographed. This illumination is frequently disadvantageous because round, curved or irregularly shaped surfaces, such as those of a human face appear, unnaturally flat. In addition, direct lighting creates photographs having shadows on, or alongside, the subject or on nearby walls. When taking color photographs of a subject's face while using direct illumination, the subject's eyes frequently appear red instead of having their natural color.

To minimize the problems associated with direct illumination, it has become the practice to orient flash reflectors so that at least a component of the flash illumination does not parallel the optical axis of the camera lens bounces off an adjacent surface such as a ceiling. This provides indirect, more diffused illumination of the scene or subject being photographed.

The patent literature includes a number of patents directed to such a procedure: specifically, U.S. Pat. Nos. 4,122,333; 4,233,648; 3,869,604, and 4,512,644. The patent literature also includes U.S. Pat. Nos. 4,122,333; 3,869,604 and 4,233,648 which disclose the concept of having a pivotal bounce flash member. While these bounce flash illuminators are pivotally mounted, there is no provision with these illuminators for selecting the bounce angle automatically. U.S. Pat. No. 4,512,644 discloses a flash device having a servo controlled illuminating angle, however, the illuminating angle is determined according to the focal length of the camera lens and the servo controller is switched off when the flash illuminator is operated in a bounce flash mode.

In view of the aforementioned considerations there is a need for an approach for automatically selecting the angle at which a flash unit, or other illuminating device, directs its illumination toward the ceiling of a room when practicing bounce illumination of a subject or scene.

SUMMARY OF THE INVENTION

It is an object of the instant invention to provide new and improved methods of, and apparatus for automatically selecting an optimal angle for bounce illumination.

Upon further study of the specification and appended claims, further objects and advantages of this invention will become apparent to those skilled in the art.

In view of the aforementioned object, and other objects, the instant invention contemplates methods of, and apparatus for selecting an angle for orienting the axis of a flash illumination beam with respect to the optical axis of the lens of a camera during bounce flash photography, wherein the angle equals the inverse tangent of twice the vertical distance from the flash unit to the ceiling divided by the subject distance. In accordance with the instant invention the subject distance is determined by an automatic range finder while the ceiling distance is determined by either an automatic range finder or a manual control. The angle of the flash reflector with respect to the optical axis of the camera lens is achieved by activating a motor which drives the flash reflector to rotate until the angle selected by the formula is achieved.

BRIEF DESCRIPTION OF THE DRAWINGS

Various other objects, features and attendant advantages of the present invention will be more fully appreciated as the same becomes better understood when considered in conjunction with the accompanying drawings in which like reference characters designate the same or similar parts throughout the several views, and wherein:

FIG. 4 is a flow chart, in block diagram form, explaining the operation of the instant invention.

DESCRIPTION OF THE PREFERRED EMBODIMENTS

Figure 1:
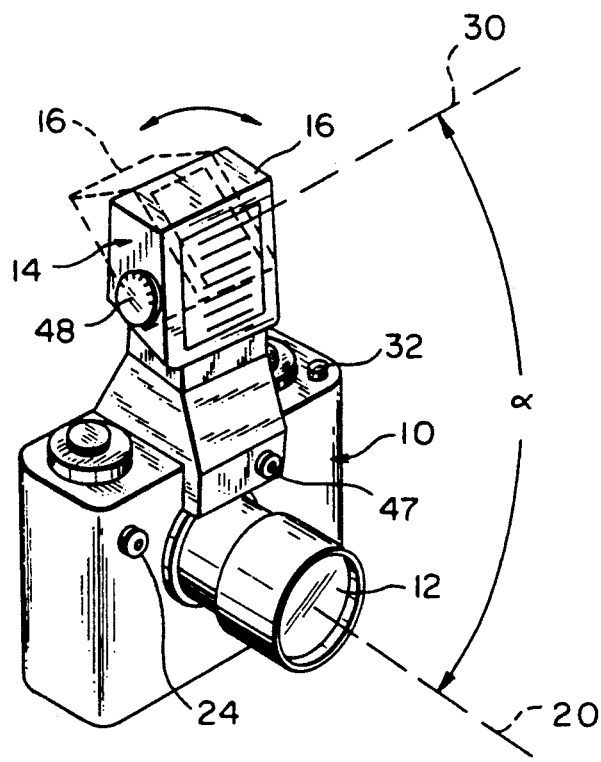
FIG. 1 is a perspective view of a camera equipped with a flash which operates in accordance with the principles of the instant invention.
Figure 2:
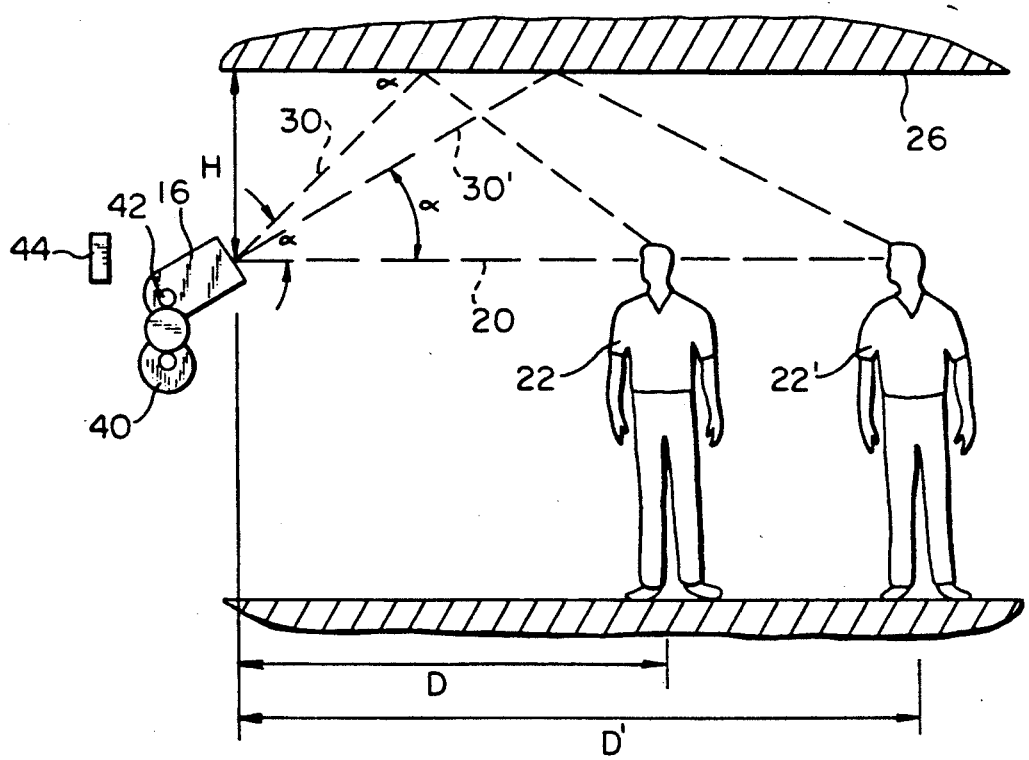
FIG. 2 is a schematic view illustrating the principles of the instant invention.

Referring now to FIGS. 1 and 2, there is shown a still camera, designated generally by the numeral 10, which includes a lens 12 and an electronic flash, designated generally by the numeral 14, the flash including a pivotable flash reflector 16 which contains the flash bulb 18. The camera lens 12 has an optical axis 20 and a focal length "D" which changes in accordance with the distance of the subject 22 being photographed from the camera lens 12. The numerical value of D is determined by an automatic range finder 24 which automatically adjusts the focus of the lens 12 in accordance with well known prior art principles. Also in accordance with well known prior art principles, a number indicative of the distance D is generated by the auto range finder 24.

The principles of the instant invention are applicable when the camera 10 is photographing the subject 22 in an enclosure such as a room with a ceiling 26 from which a beam of light travelling parallel to an illumination beam axis 30 bounces from the ceiling to illuminate the subject. Illumination of the subject 22 is enhanced if the beam of light is reflected from the ceiling 26 so that the illumination axis 30 makes an optimal angle "α" with the ceiling. The angle α is a function of the distance D as well as a function of the distance "H" from the optical axis 20 of the camera lens 12 to the ceiling 26. The distance or height H is readily determinable by automatic range finder 32 on the top of the camera 10 or top of the flash unit 14 or may be optionally entered manually by estimating the ceiling height and subtracting about 5 feet (the height of the camera from the floor).

In most situations it is desirable for the light beam to be reflected from the ceiling 26 in such a way as to impinge generally upon the subject 22 being illuminated when film in the camera 10 is exposed instead of illuminating an area between the subject and the camera or an area beyond the subject. In accordance with the instant invention, this is accomplished by having the optimal correct angle $\alpha$ between the axis 30 of the light beam emitted from the flash reflector 16 and the optical axis 20. Since it can be assumed in most situations that the light beam 28 reflects from the ceiling 26 at an angle $\alpha$ equal to the angle $\alpha$ of its impingement, a value for the angle $\alpha$ is determinable if one knows the distance D from the camera lens 12 to the subject 22 and the distance H from the optical axis 20 to the ceiling. These values are of course determined by the range finder 24 and the ceiling presence sensor provided by the range finder 32. If these values are known then the following equation is applicable:

$$\text{Tan } \alpha = \frac{H}{D/2}$$

therefore $$\alpha = \text{Tan}^{-1}(2H/D)$$

Once the value of $\alpha$ is determined, the value for $\alpha$ is fed to a servo motor 40 that is geared to a shaft 42 which mounts the flash reflector 16. In accordance with the principles of the instant invention the motor 40 drives the shaft 42 to rotate either clockwise or counter clockwise until an angular position sensor 44 indicates that the flash reflector 16 is oriented so that the central axis 28 of the light beam 28 extends at the selected angle $\alpha$ with respect to the optical axis 20 of the camera lens 12.

When the distance between the camera lens 12 and subject 22 changes from D to D', the optimal angle changes from $\alpha$ to $\alpha'$ causing the motor 40 to rotate the reflector 16 to assume the new angle $\alpha'$.

Figure 3:
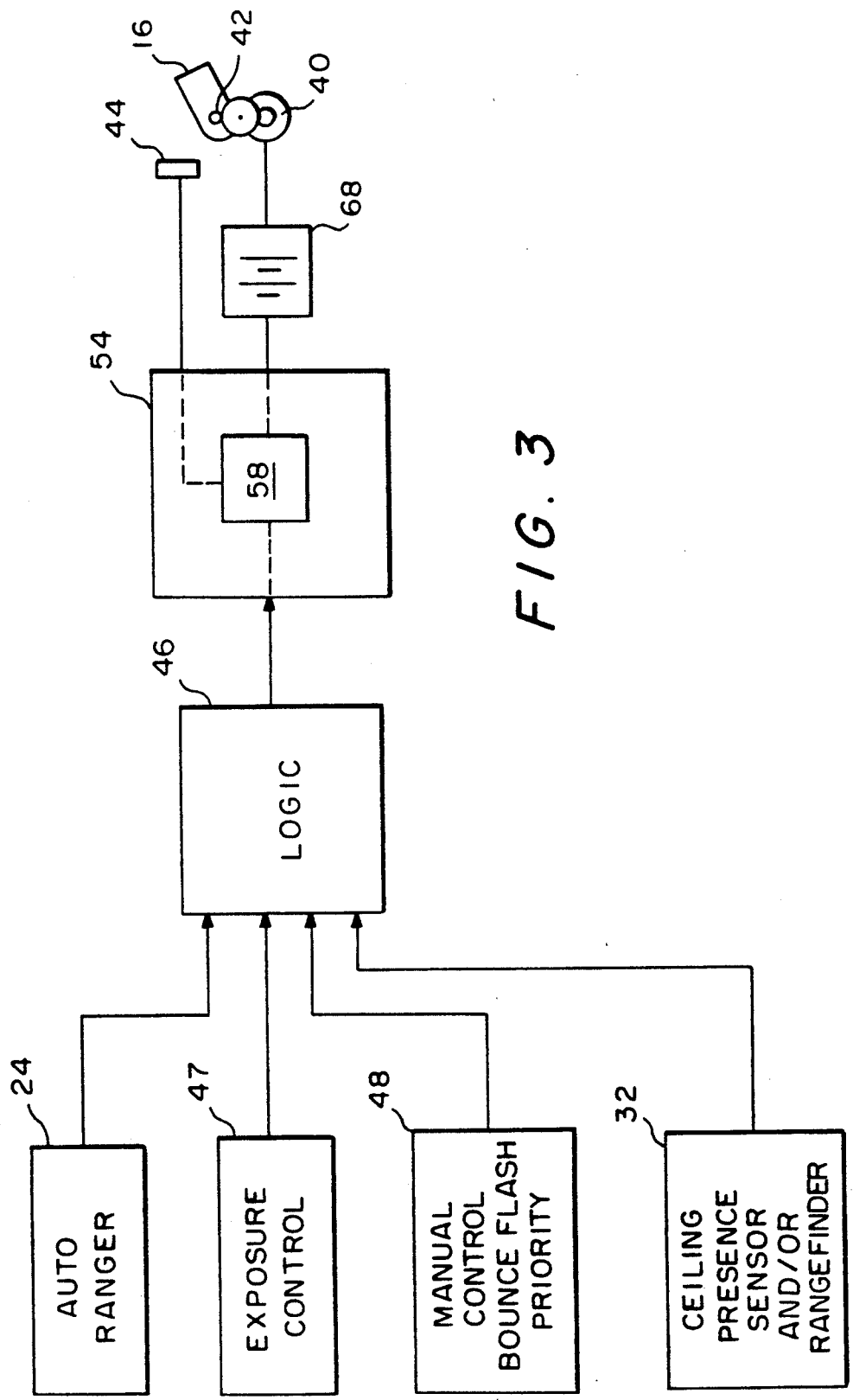
FIG. 3 is a diagrammatical view illustrating a control system for the instant invention.

Referring now to FIG. 3 there is shown a block diagram illustrating the circuit elements used to practice the instant invention. The range finder 24 determines a value for the distance D and feeds that value to a logic circuit 46 which is a preferably conventional microcomputer. In addition, an exposure circuit 47 determines the amount of illumination required for the subject 22 and feeds the information to the logic circuit 46. The exposure control determines whether there will be a flash or no flash or whether the flash bulb will have a high EV or low EV. A manual control 48 for selecting whether or not to use a bounce flash or direct flash is provided. The manual control can be an on/off device which also includes a setting for ceiling height therein. Typically, the ceiling 26 will be between 3 and 5 feet from the top of the camera 10. This selection may be dialed in by the manual controller 48 and the selected value for the parameter H is fed to the logic circuit 46. Alternatively, the ceiling presence sensor 32 which utilizes an automatic range finder optically determines the distance H to the ceiling 26 and feeds the value for H to the logic circuit 46. The logic circuit 46 includes the algorithm:

$$\alpha = \text{Tan}^{-1}(2H/D)$$

and feeds its output to a servo motor controller 54 which operates the motor 40 to correctly position the flash reflector 16.

The servo motor controller 54 includes the angular position detector 44 connected thereto which indicates the actual angle of the flash reflector 16 and a comparator 58 which compares the actual angle $\alpha$ of the flash reflector to the desired angle $\alpha$. If the actual angle differs from the desired angle $\alpha$, the servo motor controller 54 delivers current from the camera battery 68 of a polarity to drive the motor 40 until the difference between the angle detected by the position indicator 56 and the desired angle $\alpha$ in the comparator 58 is zero, whereupon the motor stops and the flash reflector 16 is properly positioned for the distance D of the subject 22 from the lens 12 and the height H from the optical axis 20 to the ceiling 26.

Referring now to FIG. 4, there is shown a flow chart sequencing the steps taken in performing the method of the instant invention, wherein when a decision is made to photograph, a scene or subject 22, the procedure is started by determining the light level with exposure control 46. If the light level is high there will be no flash by the illuminator 14. If the light level is low then a decision is made by the operator through the manual controller 48 to use or not to use the bounce flash mode. If the photograph is taken beneath a ceiling 26 and a decision is made to employ the bounce flash then the distance H is fed to logic control 44 which also has been fed the subject distance D. D is of course determined whenever a decision is made to take any photograph since it is provided by the range finder 24 of the camera 10. The logic control 44 determines the value for $\alpha$ which is used to set the angle of the flash reflector 16 with respect to the optical axis 20 of the lens 12. Once the angle $\alpha$ of flash reflector 16 is set, a trigger 60 exposes the film in the camera 10 to produce a negative image 62 of the subject or scene 22.

The entire texts of all applications, patents and publications, if any, cited above and below, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of illuminating a subject when recording an image of the subject under a ceiling with a camera having a lens establishing an optical axis for alignment with the subject, wherein the camera includes an illuminator pivotally mounted on the camera for projecting a beam of light along an illumination axis, the method comprising the steps of:
   determining a value for a distance "D" between the lens and the subject;
   determining a value for a distance "H" between the camera and ceiling;
   determining a value for an angle "$\alpha$" between the optical axis and illumination axis as a function of the value of D and the value of H; and
   adjusting the angular orientation of the illuminator with respect to the camera by automatically pivoting the illuminator until the angle between the illumination axis and optical axis is substantially equal to $\alpha$, whereby the subject is illuminated by the beam of light after the beam of light bounces from the ceiling.

2. The method of claim 1 wherein the value of the distance H is determined by a range finder oriented vertically with respect to the optical axis of the lens.

3. The method of claim 1 wherein the value of the distance H is selected manually according to the observed height of the ceiling and level at which the image is taken.

4. The method of claim 1 wherein the value for the distance D is determined automatically upon focusing the lens on the subject.

5. The method of claim 1 wherein the image is recorded by photography and wherein the illuminator is a flash illuminator.

6. The method of claim 1, wherein the step of determining the value for the angle $\alpha$ is determined in accordance with the equation:

$$\alpha = \text{Tan}^{-1}(2H/D).$$

7. An apparatus for illuminating a subject when recording an image of the subject under a ceiling with a camera having a lens thereon, which lens establishes an optical axis, the apparatus comprising:
an illuminator for projecting a beam of light along an illumination axis;
means for pivotally mounting the illuminator on the camera;
motor means for automatically causing the illuminator to pivot wherein the illuminator axis automatically assumes an angular orientation "$\alpha$" with respect to the optical axis of the lens upon energizing the motor;
means for automatically selecting a value for o, the automatic selecting means including:
first determining means for automatically determining a value "D" for the distance between the lens and subject;
second determining means for determining a value "H" for the distance between the optical axis and ceiling;
third determining means connected to the first and second determining means for determining the value of "$\alpha$" as a function of D and H, the third determining means having an output proportion to $\alpha$;
means connected to the third determining means for comparing the output of the third determining means to the actual angular position of the illuminator, and
means for energizing the motor means to pivot the illuminator until the actual angular position of the illumination axis with respect to the optical axis equals $\alpha$.

8. The apparatus of claim 7 wherein the second determining means is a range finder positioned on top of the camera.

9. The apparatus of claim 7 wherein the second determining means is a manually operable means.

10. The apparatus of claim 7 wherein the camera is a photographic camera for recording the image on film and wherein the illuminator is a flash illuminator.

11. The apparatus of claim 7, wherein the third determining means determines the value of the angle $\alpha$ in accordance with the equation:

$$\alpha = \text{Tan}^{-1}(2H/D).$$

12. A camera comprising:
a lens for focusing along an optical axis an image of a subject on photographic film;
a range finder for determining a distance "D" from the lens to the subject;
means for determining a distance "H" from the camera to the ceiling;
a flash illuminator for projecting a light beam along an illumination axis to illuminate the subject;
means for mounting the flash illuminator on the camera; the mounting means including a motor to pivot the illumination means, wherein the illuminator axis assumes a selected angle "$\alpha$" with respect to the optical axis;
means for selecting the angle "$\alpha$" as a function of D and H:
means for connecting the selecting means to the motor for comparing the actual angular position of the illumination axis with respect to the optical axis to $\alpha$, and
means for causing the motor to pivot the flash illuminator until the actual angular position of the illuminator axis with respect to the optical axis equals $\alpha$, whereby the illumination beam illuminates the subject upon bouncing from the ceiling.

13. The camera of claim 10 wherein the means for determining the distance H is a range finder on top of the camera.

14. The camera of claim 10 wherein the means for determining the distance H is a manually operated device.

15. The camera of claim 12, wherein the means for selecting the angle selects the angle in accordance with the equation:

$$\alpha = \text{Tan}^{-1}(2H/D).$$

* * * * *